United States Patent
Rius Rossell et al.

(10) Patent No.: US 9,393,822 B2
(45) Date of Patent: Jul. 19, 2016

(54) METHODS FOR PRINTING WITH A PRINTHEAD

(71) Applicant: Hewlett-Packard Development Company, L.P., Houston, TX (US)

(72) Inventors: Marti Rius Rossell, Sant Cugat del Valles (ES); Peter Morovic, Sant Cugat del Valles (ES); Jan Morovic, Colchester (GB)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 14/646,307

(22) PCT Filed: Nov. 29, 2012

(86) PCT No.: PCT/EP2012/073996
§ 371 (c)(1),
(2) Date: May 20, 2015

(87) PCT Pub. No.: WO2014/082673
PCT Pub. Date: Jun. 5, 2014

(65) Prior Publication Data
US 2015/0298474 A1 Oct. 22, 2015

(51) Int. Cl.
*B41J 29/38* (2006.01)
*B41J 2/165* (2006.01)
*H04N 1/60* (2006.01)

(52) U.S. Cl.
CPC .............. *B41J 29/38* (2013.01); *B41J 2/16526* (2013.01); *H04N 1/60* (2013.01)

(58) Field of Classification Search
CPC .... B41J 2/04541; B41J 2/04543; B41J 29/38; B41J 2/145; B41J 2/16526

USPC ................. 347/9, 10, 12, 40, 41, 47
See application file for complete search history.

(56) References Cited

U.S. PATENT DOCUMENTS

| 5,896,142 A | 4/1999 | Yamanaka |
| 6,166,822 A | 12/2000 | Harrington, III et al. |

(Continued)

FOREIGN PATENT DOCUMENTS

| CN | 1578386 | 2/2005 |
| CN | 1966267 | 5/2007 |

(Continued)

OTHER PUBLICATIONS

International Search Report and Written Opinion, Aug. 22, 2013, PCT Patent Application No. PCT/EP2012/073996, European Patent Office, HPDC.
International Search Report and Written Opinion, May 17, 2013, PCT Patent Application No. PCT/EP2012/064936, HPDC.
Lee et al. "The Application of Drop-on-demand Ink Jet Technology to Color Printing", IEEE, 1984, vol. 28; Issue 3, pp. 307-313.

*Primary Examiner* — Jannelle M Lebron
(74) *Attorney, Agent, or Firm* — HP Inc. Patent Department

(57) ABSTRACT

A method for printing, comprising: obtaining an imaging matrix, in which each row or each column of cells is associated with at least a nozzle of a printhead, and in which each cell contains an initial value of a parameter which is related to an amount of ink to be deposited on the print medium; dividing the imaging matrix into at least two subsets of cells, such that each cell of the matrix belongs to one of said subsets; associating with each subset of cells a conversion function; obtaining a converted imaging matrix by applying to the initial value in each cell the function that corresponds to the subset to which the cell belongs; and printing using said converted imaging matrix.

20 Claims, 5 Drawing Sheets

(56) References Cited

U.S. PATENT DOCUMENTS

| | | |
|---|---|---|
| 6,166,828 A | 12/2000 | Yamada et al. |
| 6,547,354 B1 | 4/2003 | Askeland et al. |
| 6,575,545 B2 | 6/2003 | Bruch et al. |
| 7,576,888 B2 | 8/2009 | Sakai et al. |
| 7,866,778 B2 | 1/2011 | Silverbrook et al. |
| 2005/0078133 A1 | 4/2005 | Molinet et al. |
| 2005/0190233 A1 | 9/2005 | Bhattacharjya et al. |
| 2006/0119660 A1 | 6/2006 | Ochial et al. |
| 2007/0109606 A1 | 5/2007 | Nagae |
| 2009/0086292 A1 | 4/2009 | Klassen |
| 2010/0091053 A1 | 4/2010 | Jackson et al. |
| 2010/0165028 A1 | 7/2010 | Wright et al. |
| 2011/0211205 A1 | 9/2011 | Itogawa |

FOREIGN PATENT DOCUMENTS

| | | |
|---|---|---|
| EP | 0704307 | 4/1996 |
| JP | H022008 | 1/1990 |
| JP | 10290367 | 10/1998 |
| JP | 2000-272171 | 10/2000 |
| JP | 2001-277495 | 10/2001 |
| JP | 2003-134340 | 5/2003 |
| JP | 2009045845 | 3/2009 |
| JP | 2010-263618 | 11/2010 |
| JP | 2011177898 | 9/2011 |
| JP | 2011188319 | 9/2011 |

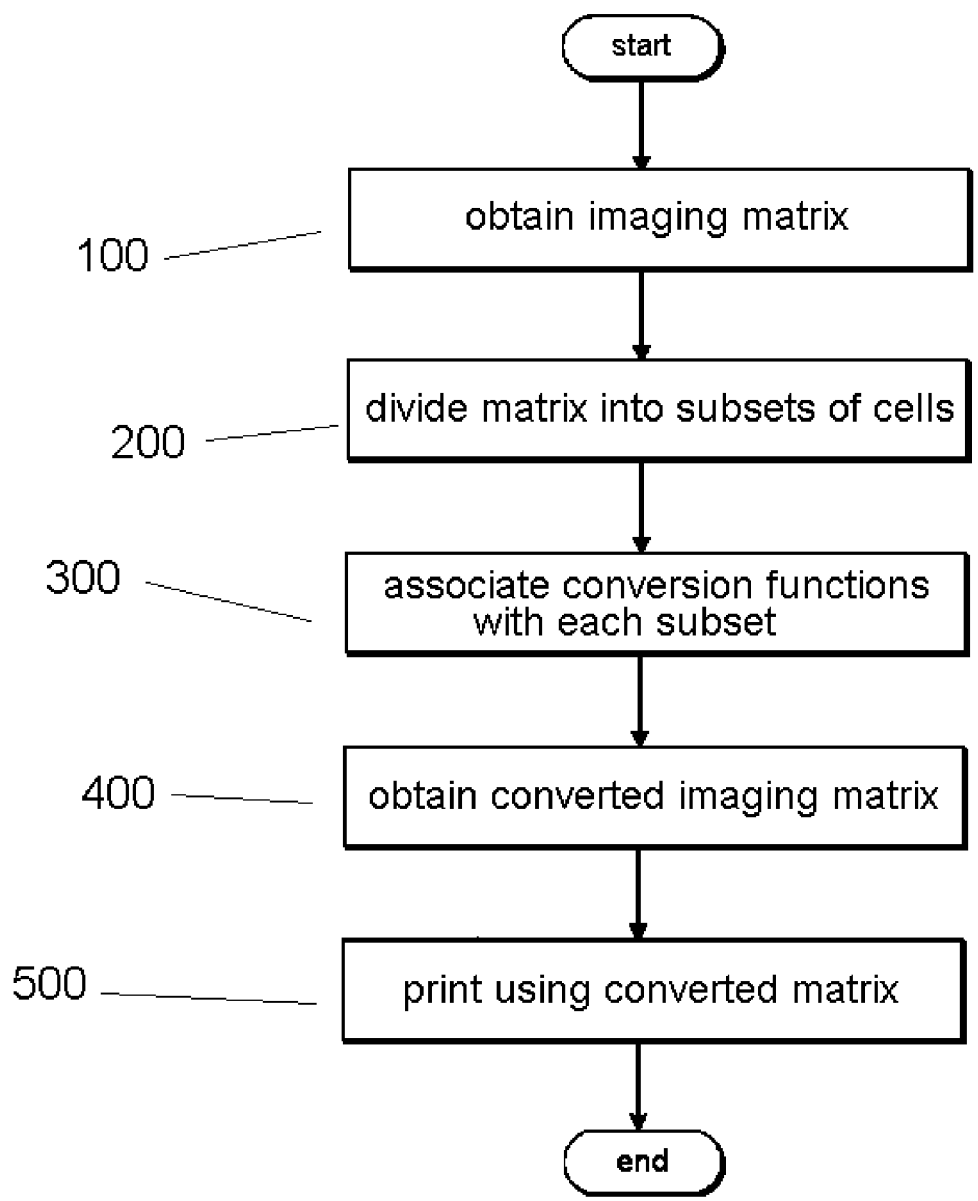

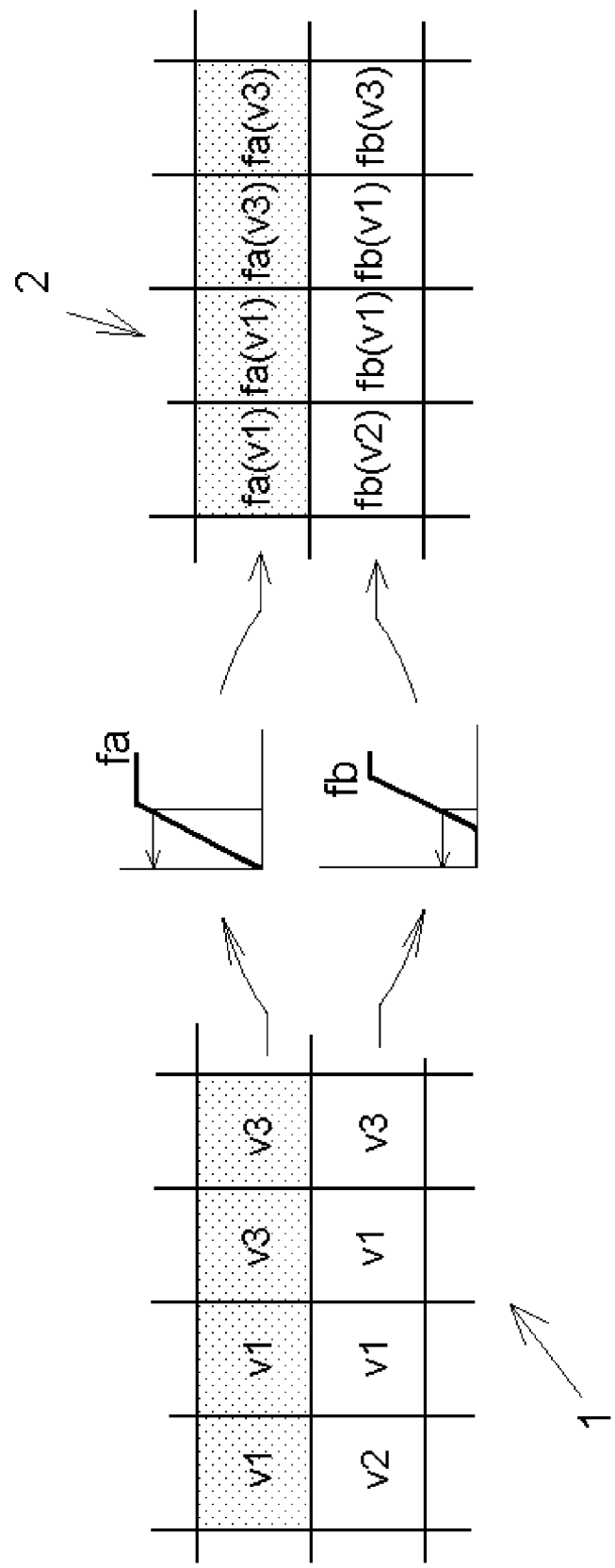

| | | | |
|---|---|---|---|
| 40 | 40 | 100 | 100 |
| 40 | 40 | 100 | 120 |
| 60 | 90 | 120 | 120 |
| 70 | 100 | 160 | 200 |

→ fa →
→ fb →
→ fc →
→ fd →

| | | | |
|---|---|---|---|
| 159 | 159 | 255 | 255 |
| 0 | 0 | 143 | 223 |
| 0 | 0 | 0 | 0 |
| 0 | 0 | 0 | 32 |

| initial value | f1 | f2 |
|---|---|---|
| 0 | 0 | 0 |
| 1 | 2 | 0 |
| 2 | 4 | 0 |
| 3 | 4 | 4 |

| | | | |
|---|---|---|---|
| 1 | 1 | 2 | 2 |
| 1 | 1 | 2 | 3 |
| 1 | 2 | 2 | 3 |
| 2 | 2 | 3 | 3 |

→ f1 →
→ f2 →
→ f1 →
→ f2 →

| | | | |
|---|---|---|---|
| 2 | 2 | 4 | 4 |
| 0 | 0 | 0 | 4 |
| 2 | 4 | 4 | 4 |
| 0 | 0 | 4 | 4 |

METHODS FOR PRINTING WITH A PRINTHEAD

CROSS-REFERENCE TO RELATED APPLICATION

This application is a U.S. National Stage Application of and claims priority to International Patent Application No. PCT/EP2012/073996, filed on Nov. 29, 2012, and entitled "METHODS FOR PRINTING WITH A PRINTHEAD," which is hereby incorporated by reference in its entirety.

The present invention relates to methods for printing with a printhead.

A printing device is generally configured to produce print content (e.g., text, image, etc.) on a print medium in response to receiving a print job.

Scanning inkjet printers employ one or more printheads mounted on a carriage which travels repeatedly across a scan axis as the print medium is advanced stepwise past the scan axis. The printheads may have a plurality of nozzles for firing ink drops on the medium, such that they lay down swaths of ink during each scan travel, between advances of the print medium.

However, as the printheads travel, they create a current of air across the uncapped (or decapped) nozzles of the printheads: the current of air may cause evaporation of a solvent vehicle component of the ink, and this in turn may bring about pigment enrichment, and increase ink viscosity in proximity to the nozzle orifice. As a consequence, nozzles that have not fired for a certain amount of time may fire smaller ink drops, or may not fire any ink, and/or may fire drops on the medium with a positioning error.

When this happens, it may take a certain number of firing events before the nozzle recovers its normal parameters of operation, and this may result in no ink being fired on an area of the medium, or that some ink drops have a smaller volume. This absence of ink or smaller volume of the ink drops may lead to this area of the medium being seen as a different colour: this visual artifact is known as decap.

Decap also occurs in Page-Wide Array (PWA) printers, which employ an array of printheads extending across the width of the page, which is maintained in a static position during printing while the medium advances under the printheads. A current of air is similarly created by the relative movement between the medium and the printheads.

In scanning printers, the printheads may be controlled to fire a short burst of ink drops into an ink collector after every print swath ("fly-by-spit"), and this may help to reduce the severity of decap: however, Page-Wide Array printers have much more limited means of refreshing the status of nozzles in a periodic way, and therefore they are particularly sensitive to decap. In multipass Page-Wide Array printers the intervals between nozzle refresh operations are multiplied by the number of passes, and the effect of decap may thus be even more visible.

With methods for printing with a printhead according to examples described below the occurrence and/or effects of decap are reduced.

Some non-limiting examples will be described in the following with reference to the appended drawings, in which:

FIGS. 1 and 2 illustrate schematically methods for printing with a printhead, according to examples disclosed herein;

FIG. 4 shows the result of applying the functions of FIGS. 3a to 3d to an example contone matrix;

FIG. 5 shows another example of conversion functions that may be applied in examples of a method for printing;

FIG. 6 shows the result of applying the functions of FIG. 5 to an example halftone matrix;

Figure 3A:
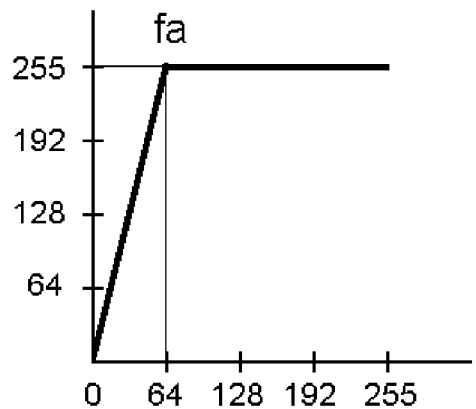
FIGS. 3a to 3d show an example of conversion functions that may be applied in examples of a method for printing.

In an inkjet printer each page of a print job may be rasterized, that is, converted from a computer output format such as Postscript™ or Portable Document Format™ to a contone (continuous tone) bitmap, for example by means of a raster image processor.

A contone bitmap may be expressed as an imaging matrix, i.e. an array of cells arranged in rows and columns and containing imaging data, in which each cell of the contone matrix contains information related to the colour of a corresponding area of the image to be printed, for example as a proportion of primary colours R, G, B. Consequently, each cell contains parameters that are related to the ink to be deposited on a corresponding area of the print medium.

Contones may also be defined in the ink space, and there may be a contone matrix for each of the ink channels employed in printing: each cell of the matrix may contain a value of a parameter related to the amount of a particular colour ink to be deposited on the print medium, in at least 8 bits. For example, such a contone matrix may contain, for each ink in the printing system, values between 0 and 255, each indicating a specific level of ink.

A contone matrix may be processed to obtain a halftone image, wherein for each pixel of the halftone image there may be typically specified a number of ink drops of various colours, to give the appearance of a continuous tone image when printed. The most basic colour printers use combinations of cyan, magenta and yellow (CMY) to make the various colours; for increased quality, true black ink may be also available (CMYK), and also additional inks, for example light cyan and light magenta (CcMmYK).

Instead of specifying the number of ink drops, the pixels of the halftone image may also specify different information, related to ink drops, such as a halftone level; the number of ink drops may then be determined later on in the processing pipeline.

The halftone image may thus be expressed as an imaging array or matrix (halftone matrix), in which each cell contains information related to the ink drops to be deposited on a corresponding area of the print medium.

A printhead may have a controller which analyses the halftone image and defines nozzle firing sequences suitable for causing the nozzles of the printhead to lay down drops of ink at the correct points on the print medium for reproducing the halftone image.

In a scanning printer in which printheads are generally arranged with their nozzles extending in the paper advance direction, each row of a related contone matrix or halftone matrix is associated with at least one specific nozzle of the printhead; each column of the matrix is then is associated with firing steps over time, and therefore to a position of the carriage along the scan axis.

In a page wide array (PWA) printer, since the printheads are generally arranged with their nozzles extending in a direction at right angles to the paper advanced direction, each column of a related contone matrix or halftone matrix is associated with at least one specific nozzle; each row of the matrix is then associated with firing steps over time.

As explained above, decap may arise because nozzles that have not fired for a certain amount of time need a number of firing events before recovering. The expression "firing event" refers herein to the action of one particular nozzle that fires or tries to fire a drop of ink during a firing step.

If a nozzle fires a drop of ink every M firing steps, and if it takes DR firing events to recover a nozzle from e. g. a viscous plug, then the length of the print medium affected by decap is approximately:

Decap length=M×DR

The lower M is (that is, the higher is the firing frequency of a nozzle) the smaller is the decap length for this nozzle, because the nozzle recovers from decap earlier.

Examples of methods for printing as disclosed herein reduce the visibility of decap by causing some of the nozzles of a printhead to fire more frequently and thus reduce the decap length.

Examples of methods for printing with an inkjet printhead that comprises nozzles to fire ink drops on a print medium are disclosed in the following, with reference to FIGS. 1 and 2.

In such examples, an imaging matrix 1 may be obtained in box 100; a portion of such a matrix 1 comprising two rows and fours columns is shown in FIG. 2.

Each cell of the matrix may contain an initial value (v1, v2, v3, ... ) of a parameter which is related to an amount of ink to be deposited on the print medium. The matrix may be created during a printing process on the basis of the image to be printed, and more particularly on the colours that have to be printed on each portion of the print medium.

The parameter may be e.g. a number of ink drops to be deposited on an area of the print medium, or a halftone level, in case the matrix is a halftone matrix; or it can be a value representing a level of ink, if the matrix is a contone matrix in the ink space.

In the imaging matrix 1 of FIG. 2 each row of cells may be associated with at least one specific nozzle of the printhead: that is, the values in one row are related to the ink that at least one specific nozzle has to fire on the print medium, in different firing steps over time. This configuration is typical of a scanning printer.

In other examples, it is each column of the matrix that may be associated with at least one specific nozzle of the printhead; this configuration is typical of a Page-Wide Array printer.

According to examples of a method, the imaging matrix 1 may be divided in box 200 of FIG. 1 into at least two subsets of cells, such that each cell of the matrix belongs to one of said subsets; in this example, the matrix may be divided such that the first row shown in FIG. 2 belongs to one subset, and the second row belongs to another subset.

One subset, in this case for example the subset of the first row of the matrix 1, may be considered a prioritized subset; in FIG. 2 the cells in the first row are shown with a dotted filling, to indicate they belong to the prioritized subset.

Each row of cells of the matrix corresponds to specific nozzles of the printhead: consequently, nozzles that correspond to the prioritized subset are also prioritized.

Similarly, in examples wherein the columns of cells of the matrix correspond to specific nozzles, the matrix may be divided in subsets each comprising one or more columns; consequently, some nozzles of the printhead are prioritized.

A conversion function may be associated with each subset of cells, in box 300 of FIG. 1. Such a conversion function provides, for each possible initial value (v1, v2, v3, ... ) of the parameter in the cells, a new value which is also related to an amount of ink to be deposited on the print medium.

In FIG. 2, a certain conversion function $\underline{fa}$ is associated with the subset comprising the first row of cells, i.e. the prioritized subset, and another conversion function $\underline{fb}$ is associated with the subset comprising the second row of cells, i.e. a subset that is not prioritized. Functions $\underline{fa}$, $\underline{fb}$ are depicted schematically in FIG. 2 as graphs on a Cartesian coordinate plane, wherein e.g. the abscissa contains the values v1, v2, v3, ... of the parameter in the imaging matrix 1 and the ordinate contains the new values obtained applying the function to the values in the abscissa. However, the functions may be expressed, handled or represented using any kind of mathematical formula, correspondence or look-up table, etc.

The new values given by the functions may correspond to the same parameter that is initially present in the cells of the imaging matrix 1, or they may be values of a different parameter. For example, the parameter initially present in the imaging matrix may be an amount of ink drops, and the new values provided by the conversion functions may also be ink drops; in another example, the parameter initially present in the imaging matrix may be a halftone level, and the new values provided by the conversion functions may be amounts of ink drops.

In the example of FIG. 2 the new values obtained from v1, v2, v3, ... with conversion function $\underline{fa}$ are indicated as fa(v1), fa(v2), fa(v3), ... and those obtained with conversion function $\underline{fb}$ are indicated as fb(v1), fb(v2), fb(v3), ...

The conversion function $\underline{fa}$ associated with the prioritized subset of cells provides a new value, for at least some possible initial value of the parameter, that corresponds to an amount of ink that is greater than or equal to the amount of ink corresponding to the initial value. For example, the amount of ink corresponding to value fa(v1), i.e. the amount of ink that is deposited on the print medium when value fa(v1) is employed for printing, is greater than or equal to the amount of ink corresponding to value v1.

The conversion function associated with the prioritized subset may provide new values that correspond to amounts of ink that are greater than or equal to the amount of ink corresponding to the initial value, for each initial value of the parameter, and not for only some of them.

Thus, the conversion function causes the nozzles of the prioritized subset of cells to fire more ink than they would fire if the initial values in the imaging matrix 1 were applied.

Furthermore, the new value provided, for at least some possible initial value, by the function $\underline{fa}$ associated with the prioritized subset of cells, is greater than or equal to the new values provided by the conversion functions, such as $\underline{fb}$, associated with other subsets. By a "greater" value it is herein meant a value that causes a larger amount of ink to be deposited on the print medium; the conversion function of the prioritized subset thus causes the nozzles of the prioritized subset of cells to fire more ink than other nozzles.

The conversion function associated with the prioritized subset may provide new values that are greater than or equal to the new values provided by the conversion functions associated with other subsets, for each initial value of the parameter, and not for only some of them.

Accordingly, in examples illustrated in FIG. 2 the conversion functions may be such that fa(v1)≥fb(v1), fa(v2)≥fb(v2), fa(v3)≥fb(v3), etc.

According to examples of a method, a converted imaging matrix 2 (FIG. 2) may be obtained, in box 400 of FIG. 1, by applying to the initial value v1, v2, v3, ... in each cell the function that corresponds to the subset to which the cell belongs.

For example, the first cell of the first row of imaging matrix 1 in FIG. 2 belongs to the prioritized subset of cells with which function $\underline{fa}$ is associated, and it contains value v1; the new value obtained applying the corresponding function to the initial value in the cell is thus fa(v1), and this value is entered in the corresponding cell in the converted imaging matrix 2.

Similarly, the converted imaging matrix 2 contains values fa(v1), fa(v3), fa(v3) in the rest of the cells of the first row, and values fb(v2), fb(v1), fb(v1), fb(v3) in the cells of the second row, as shown in FIG. 2.

Printing is then carried out, in box 500 of FIG. 1, using the converted imaging matrix 2, instead of the initial imaging matrix 1.

Printing is carried out completing any suitable steps, which may depend on each individual case: for example, if the imaging matrix 1 is a halftone matrix, the printing process may continue by generating suitable print masks based on the converted matrix 2; if the imaging matrix 1 is a contone matrix, the printing process may involve for example generating a halftone on the basis of the converted imaging matrix 2.

The result of examples such as disclosed herein is that some nozzles of the printhead, corresponding to the prioritized subset of cells in imaging matrix 1 (first row of cells in FIG. 2), fire an increased amount of ink with respect to what was intended in imaging matrix 1. Firing an increased amount of ink involves firing more frequently: for example, it may involve firing in every firing step, and not only once every two or more firing steps.

Since it takes a certain number of firing attempts before the nozzle recovers from decap, nozzles that fire more frequently recover earlier, so the portion of the print medium on which they deposit no ink (decap length) is smaller. As a consequence, the effect of decap is less visible in the printed image.

Other nozzles of the printhead, corresponding to a non-prioritized subset of cells of imaging matrix 1 (second row of cells in the figure) may fire less ink than nozzles of the prioritized subset, and also less ink with respect to what was intended in imaging matrix 1, and their decap length may therefore be longer. However, because in adjacent areas of the printed image there are ink dots fired by the nozzles associated with prioritized cells, the overall visual effect may be improved.

Furthermore, since nozzles corresponding to subsets of cells having a low priority may fire less ink than intended in the imaging matrix 1, the overall amount of ink deposited in a region of the image may be maintained relatively similar to the overall amount of ink intended in the imaging matrix 1, thus maintaining the overall aspect of the image.

In examples of methods disclosed herein the imaging matrix may be divided into at least three subsets of cells, which are ranked between a prioritized subset of cells, at least one intermediate subset of cells, and a non-prioritized subset of cells.

In such cases, the conversion function associated with each subset provides a new value, for each possible initial value of the parameter, that is greater than or equal to the new values provided by the conversion functions associated with subsets that have a lower rank.

For example, FIGS. 3a to 3d show conversion functions $\underline{fa}$, $\underline{fb}$, $\underline{fc}$ and $\underline{fd}$ corresponding to a case wherein an imaging matrix is divided in four subsets of cells, which have ranked priorities: they comprise a prioritized subset having associated function $\underline{fa}$, a less prioritized subset having associated function $\underline{fb}$, an even less prioritized subset having associated function $\underline{fc}$, and a lowermost-prioritized subset having associated function $\underline{fd}$.

The imaging matrix in this example may be a contone matrix in the ink space, wherein each cell of the matrix contains an integer value between 0 and 255, corresponding to an amount of one ink (for example one of black, cyan, magenta, etc.) to be fired.

It can be seen from FIG. 3a that the conversion function $\underline{fa}$ corresponding to the prioritized subset of cells outputs new values that are greater than the initial values (except for initial value 255, which remains the same after conversion).

Figure 3B:
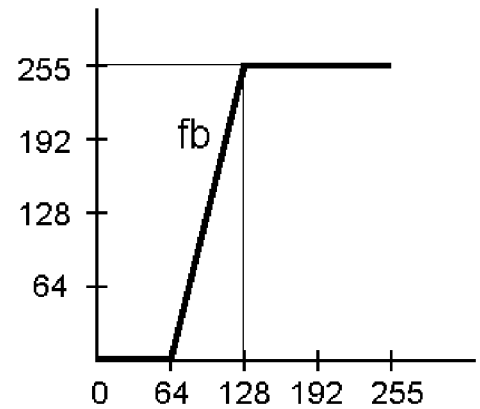
Figure 3C:
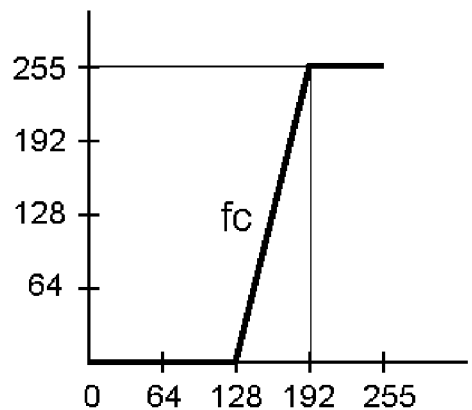

From FIGS. 3b and 3c it can be seen that some of the new values obtained with functions $\underline{fb}$ and $\underline{fc}$ will be smaller than the corresponding initial values, while other new values will be greater than the corresponding initial values.

Figure 3D:
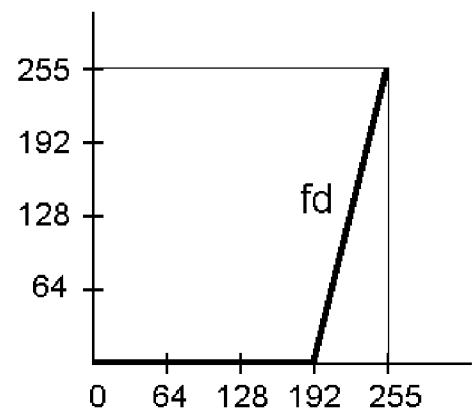

Finally, from FIG. 3d it can be seen that the conversion function $\underline{fd}$ corresponding to the subset of cells with lower priority outputs new values that are smaller than the initial values (except for initial value 255, which remains the same after conversion).

Furthermore, conversion function $\underline{fa}$ outputs values that are greater than or equal to values outputted by function $\underline{fb}$ for every possible initial value; similarly, $\underline{fb}$ outputs values greater than or equal to values outputted by function $\underline{fc}$, and $\underline{fc}$ outputs values that are greater than or equal to values outputted by function $\underline{fd}$.

FIG. 4 shows an example of a portion of a contone imaging matrix 10 containing initial values of between 0 and 255, and of the corresponding portion of a converted imaging matrix 20 that contains the new values obtained by applying the conversion functions of FIGS. 3a to 3d to the cells of the imaging matrix 10: functions $\underline{fa}$, $\underline{fb}$, $\underline{fc}$, and $\underline{fd}$ are respectively applied to the first, second, third and fourth rows. The most prioritized subset of cells is the first row of cells (function $\underline{fa}$), which is shown in dotted filling.

In examples of a method, in subsequent rows of the matrix (not shown in the figure) the structure may be repeated, e.g. functions $\underline{fa}$, $\underline{fb}$, $\underline{fc}$, and $\underline{fd}$ would be respectively applied to the fifth, sixth, seventh and eighth row, and so on.

When printing is carried out using the converted matrix 20, it can be seen in FIG. 4 that nozzles corresponding to the first row would fire very frequently because they have to fire large amounts of ink, while nozzles corresponding to other rows would fire less ink.

In practice, there is a limit to the amount of ink that a nozzle may fire; this means that in areas of the image with darker colours (i.e. larger values of the parameter in the imaging matrix, for example those in the last two columns of matrix 10 in FIG. 4), a very strong concentration in some subsets may not be possible, i.e. the distribution of ink over the cells and nozzles may have to be more even than in the case of lighter colours. However, the problem of decap is also smaller in dark colour areas of the image than in areas of lighter colour, and examples of method as disclosed herein allow a stronger concentration of the ink in some of the cells and nozzles in the case of lighter colours.

Another example of methods for printing with a printhead comprising nozzles is disclosed with reference to FIG. 5, which shows conversion functions $\underline{f1}$, and $\underline{f2}$, in this case in the format of a look-up table, and corresponding to a case wherein an imaging matrix is divided in two subsets of cells: a prioritized subset having associated function $\underline{f1}$, and a non-prioritized subset having associated function $\underline{f2}$.

The imaging matrix in this example may be a halftone matrix, such as halftone matrix 30 shown in FIG. 6, wherein each cell contains a parameter, in this case for example a halftone level, which may have initial values of 0, 1, 2 or 3.

As seen in FIG. 5, function $\underline{f1}$ is such that it outputs the following new values for each initial value of the halftone level:

f1(0)=0
f1(1)=2 f1(2)=4
f1(3)=4

Function f2 is such that it outputs the following new values:
f2(0)=f2(1)=f2(2)=0
f2(3)=4

In this example the new values obtained by applying conversion functions f1 and f2 to the cells of matrix 30 may be the number of drops of ink to be deposited on the print medium by the nozzles corresponding to each row. It can be seen from the table of FIG. 5 that nozzles corresponding to the subset of cells associated with f1 fire more ink than nozzles corresponding to the other subset of cells.

In FIG. 6, the conversion functions f1 and f2 are applied to a portion of halftone matrix 30 with initial values that represent halftone levels. This results in converted halftone matrix 40, wherein each cell contains a new value representing the number of drops of ink to be deposited on the print medium.

Function f1 is applied to the first and third row (dotted filling) of the matrix 30, which belong to the prioritized subset, while function f2 is applied to the second and fourth rows, which belong to the non-prioritized subset.

In other examples the parameter in the cells of the halftone imaging matrix 30 may represent a number of ink drops, instead of a halftone level, and conversion functions can be defined to convert the initial values of this parameter to new values also representing ink drops.

In some examples of method for printing with a printhead, the imaging matrix may be divided into two subsets of cells, one prioritized subset and one non-prioritized subset, and the conversion function for the prioritized subset of cells may provide new values which are increased in a predetermined proportion, up to a maximum possible value, with respect to the initial values in the cells, while the conversion function for the non-prioritized subset of cells provides a new value equal to zero for all initial values.

The predetermined proportion may be for example approximately two: that is, the new values may be approximately twice the initial values, such that the overall amount of ink in an area of the image will be similar to the overall amount intended in the initial imaging matrix.

Figure 7:
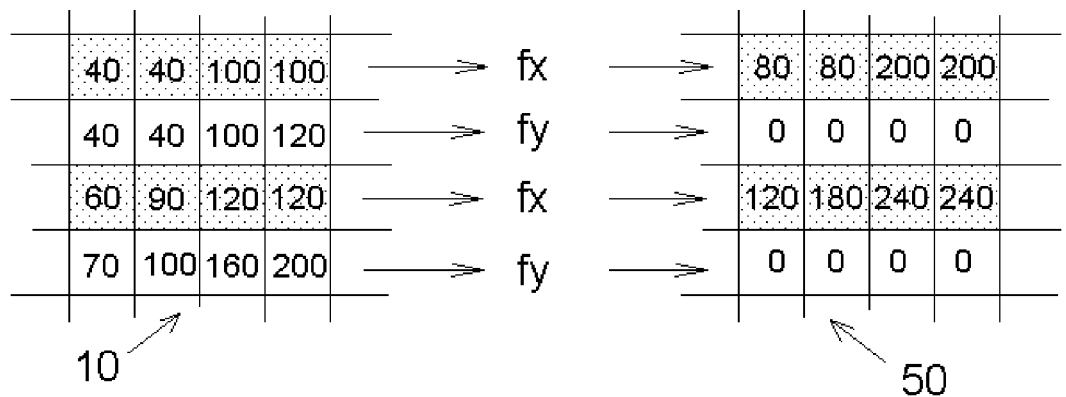
FIG. 7 shows the result of applying further examples of a method for printing to a contone matrix.

FIG. 7 shows an example of such a method, applied to a portion of a contone matrix in the ink space such as contone matrix 10 of FIG. 4, with two conversion functions fx and fy defined as:
fx(v)=2v with fx(v)≤255 (the maximum new value is 255), and
fy(v)=0
for any initial value v in the imaging matrix 10.

Two subsets of cells are defined in the matrix: a prioritized subset (first and third row, with dotted filling), with which function fx is associated, and a non-prioritized subset (second and fourth row), with which function fy is associated.

As can be seen, the converted matrix 50 obtained by applying the functions to the associated subsets of cells may concentrate in the prioritized subset all the ink to be fired.

If some cells of the imaging matrix 10 had a high initial value (above 127 in this example) that would give a new value larger than a maximum possible new value when fx is applied, then the new value for that cell would be set to said maximum (255 in the example).

Such examples are simple and may be useful in some cases, for example graphics applications, wherein generally the change in the colour density between adjacent rows or columns of an imaging matrix is relatively small, and in images with relatively light colours.

As shown in some of the examples above, each subset of cells may comprise a number of rows of the imaging matrix, or it may comprise a number of columns, for example if a method is applied in a Page-Wide Array printer.

In some such examples each subset may comprises one row or column out of two, one out of three or one out of four of the imaging matrix, wherein the rows or columns that belong to each subset are not adjacent to each other, as explained for example in relation to FIG. 4.

Examples of the methods disclosed may further involve making changes over time in the subsets of cells of the imaging matrix, and/or in the conversion functions: that is, dividing the matrix in different subsets and/or changing the priority ranking of the different subsets, and/or causing different kinds of ink distributions between the ranked subsets.

Such examples may be useful to adapt the process to different images to be printed, different printing modes, etc. or to change over time the nozzles that fire more frequently, such that substantially all the nozzles of a printhead have similar levels of use over time.

In examples of a method for printing, changes in the subsets of cells of the imaging matrix, and/or in the conversion functions may be performed after a predetermined amount of ink has been fired, or after a predetermined number of printing swaths, or also based on other criteria, such as after a print job or a number of print jobs have been completed, after a predetermined interval of time, etc.

Figure 8:
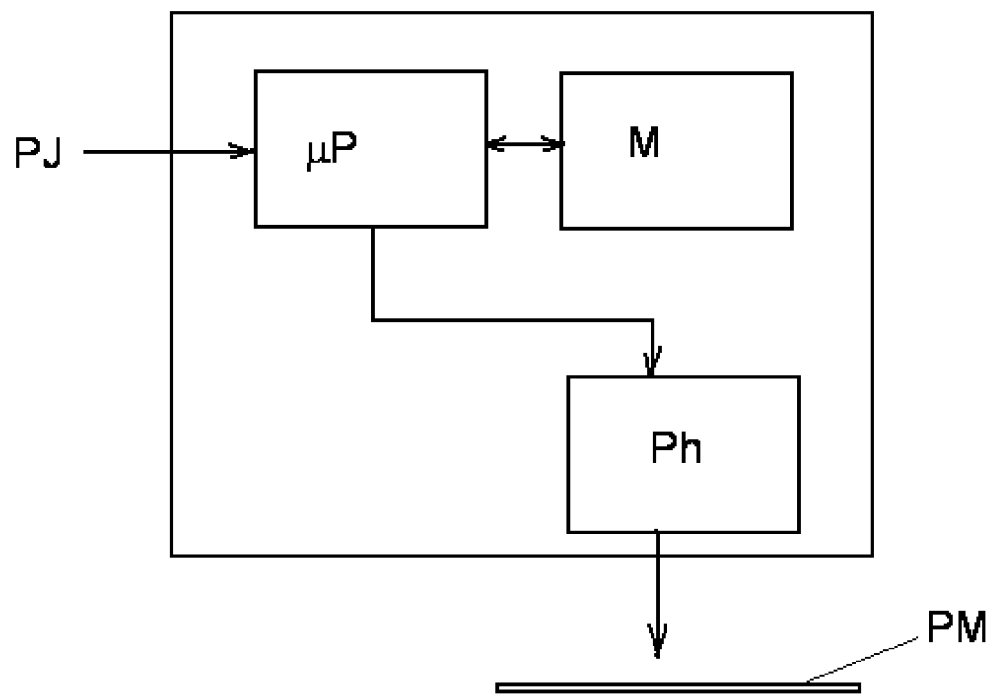
FIG. 8 shows schematically a printing apparatus in which examples of a method as disclosed herein may be applied.

FIG. 8 shows schematically an inkjet printing apparatus in which methods as disclosed herein may be applied. The apparatus may comprise a printhead Ph for printing on a print medium PM, a non-transitory storage medium M, and a processor μP adapted to receive a print job PJ. Program instructions may be embodied in the non-transitory storage medium M and may be executable by the processor μP, such that when the instructions are executed in the processor, the processor implements an example of a method as disclosed herein.

The apparatus may be for example a printer selected between a page wide array printer and a scanning printer.

A computer readable medium may have computer-executable instructions stored thereon that, if executed by a computer, cause the computer to implement an example of a method disclosed herein.

Although only a number of particular embodiments and examples have been disclosed herein, further variants and modifications of the disclosed print media products are possible; other combinations of the features of embodiments or examples described are also possible. Thus, the scope of the present invention should not be limited by particular examples or embodiments, but should be determined only by a fair reading of the claims that follow.

The invention claimed is:

1. A method comprising:
obtaining an imaging matrix, each cell of the imaging matrix containing an initial value of a parameter which is related to an amount of ink to be deposited on a print medium by nozzles of a printhead, wherein the cells of the imaging matrix are arranged in a plurality of lines forming rows or columns, each line representing a sequence of nozzle firing events over time;
dividing the imaging matrix into at least two subsets of cells, such that each line of the plurality of lines belongs to one subset of cells of said subsets of cells, wherein the lines in each subset of cells are not adjacent to each other;
associating with each subset of cells a conversion function, each conversion function providing, for each possible initial value of the parameter in the cells, a new value related to an amount of ink to be deposited on the print medium, wherein a first subset of cells is prioritized over a second subset of cells, wherein the conversion function associated with said prioritized first subset of cells provides a new value, for each of at least some possible initial values of the parameter, that is greater than a new value provided by the conversion function associated with the second subset of cells;

obtaining a converted imaging matrix by applying to the initial value in each cell the function that corresponds to the subset of cells to which the cell belongs; and printing using said converted imaging matrix.

2. A method as claimed in claim 1, wherein the imaging matrix is divided into at least three subsets of cells which are ranked between a prioritized subset of cells, at least one intermediate subset of cells, and a non-prioritized subset of cells, and wherein the conversion function associated with each subset provides a new value, for each possible initial value of the parameter, that is greater than to the new values provided by the conversion functions associated with subsets that have a lower rank.

3. A method as claimed in claim 1, wherein the conversion function for the prioritized first subset of cells provides new values which are increased in a predetermined proportion, up to a maximum possible value, with respect to the initial values in the cells, and the conversion function for the second subset of cells provides a new value equal to zero for all initial values.

4. A method as claimed in claim 1, wherein the plurality of lines comprises a number of rows of the imaging matrix.

5. A method as claimed in claim 1, wherein the plurality of lines comprises a number of columns of the imaging matrix.

6. A method as claimed in claim 1, wherein the imaging matrix is a contone matrix, and the parameter in the cells of said contone matrix represents an amount of a subtractive colour ink in at least 8 bits.

7. A method as claimed in claim 1, wherein the imaging matrix is a halftone matrix.

8. A method as claimed in claim 1, further comprising changing the subsets of cells of the imaging matrix over time.

9. A method as claimed in claim 8, wherein the subsets are changed after a predetermined amount of ink has been fired.

10. A method as claimed in claim 8, wherein the subsets are changed after a predetermined number of printing swaths.

11. A method as claimed in claim 1, further comprising changing the conversion functions over time.

12. A method as claimed in claim 11, wherein the conversion functions are changed after a predetermined amount of ink has been fired.

13. A method as claimed in claim 11, wherein the conversion functions are changed after a predetermined number of printing swaths.

14. An inkjet printing apparatus comprising a non-transitory storage medium and a processor and having program instructions embodied in the non-transitory storage medium and executable by the processor, wherein the program instructions when executed in the processor cause the processor to implement a method comprising:

obtaining an imaging matrix, each cell of the imaging matrix containing an initial value of a parameter which is related to an amount of ink to be deposited on a print medium by nozzles of a printhead wherein the cells of the imaging matrix are arranged in a plurality of lines forming rows or columns, each line representing a sequence of nozzle firing events over time;

dividing the imaging matrix into at least two subsets of cells, such that each line of the plurality of lines belongs to one subset of cells of said subsets of cells, wherein the lines in each subset of cells are not adjacent to each other;

associating with each subset of cells a conversion function, each conversion function providing, for each possible initial value of the parameter in the cells, a new value related to an amount of ink to be deposited on the print medium, wherein a first subset of cells is prioritized over a second subset of cells, wherein the conversion function associated with said prioritized first subset of cells provides a new value, for each of at least some possible initial values of the parameter, that is greater than a new value provided by the conversion function associated with the second subset of cells;

obtaining a converted imaging matrix by applying to the initial value in each cell the function that corresponds to the subset of cells to which the cell belongs; and printing using said converted imaging matrix.

15. The inkjet printing apparatus of claim 14, wherein the plurality of lines comprises rows of the imaging matrix.

16. The inkjet printing apparatus of claim 14, wherein the plurality of lines comprises columns of the imaging matrix.

17. The inkjet printing apparatus of claim 14, the printing comprising firing more ink by a nozzle associated with the prioritized first subset of cells than by a nozzle associated with the second subset of cells.

18. A computer readable medium having computer-executable instructions stored thereon that, if executed by a computer, cause the computer to implement a method comprising:

obtaining an imaging matrix, each cell of the imaging matrix containing an initial value of a parameter which is related to an amount of ink to be deposited on a print medium by nozzles of a printhead wherein the cells of the imaging matrix are arranged in a plurality of lines, each line representing a sequence of nozzle firing events over time;

dividing the imaging matrix into at least two subsets of cells, such that each line of the plurality of lines belongs to one subset of cells of said subsets of cells forming rows or columns, wherein the lines in each subset of cells are not adjacent to each other;

associating with each subset of cells a conversion function, each conversion function providing, for each possible initial value of the parameter in the cells, a new value related to an amount of ink to be deposited on the print medium, wherein a first subset of cells is prioritized over a second subset of cells, wherein the conversion function associated with said prioritized first subset of cells provides a new value, for each of at least some possible initial values of the parameter, that is greater than a new value provided by the conversion function associated with the second subset of cells;

obtaining a converted imaging matrix by applying to the initial value in each cell the function that corresponds to the subset of cells to which the cell belongs; and printing using said converted imaging matrix.

19. The computer readable medium of claim 18, wherein the plurality of lines comprises rows of the imaging matrix.

20. The computer readable medium of claim 18, wherein the plurality of lines comprises columns of the imaging matrix.

* * * * *